(12) United States Patent
Hell (10) Patent No.: US 11,034,251 B2
(45) Date of Patent: Jun. 15, 2021

(54) METHOD AND DEVICE FOR CHECKING A CONNECTION BETWEEN AN ELECTRIC VEHICLE AND A CHARGING STATION

(71) Applicant: Stephan Hell, Duisburg (DE)

(72) Inventor: Stephan Hell, Duisburg (DE)

(73) Assignee: innogy SE, Essen (DE)

( * ) Notice: Subject to any disclaimer, the term of this patent is extended or adjusted under 35 U.S.C. 154(b) by 190 days.

(21) Appl. No.: 15/801,553

(22) Filed: Nov. 2, 2017

(65) Prior Publication Data
US 2018/0056803 A1 Mar. 1, 2018

Related U.S. Application Data

(63) Continuation of application No. PCT/EP2016/055648, filed on Mar. 16, 2016.

(30) Foreign Application Priority Data

May 7, 2015 (DE) ..................... 10 2015 107 161.4

(51) Int. Cl.
| | |
|---|---|
| *H02J 7/00* | (2006.01) |
| *H02J 7/14* | (2006.01) |
| *B60L 53/18* | (2019.01) |
| *B60L 3/00* | (2019.01) |
| *B60L 53/10* | (2019.01) |
| *B60L 53/30* | (2019.01) |

(Continued)

(52) U.S. Cl.
CPC .............. *B60L 53/18* (2019.02); *B60L 3/0069* (2013.01); *B60L 11/1838* (2013.01); *B60L 53/11* (2019.02); *B60L 53/305* (2019.02); *B60L 53/66* (2019.02); *Y02T 10/70* (2013.01); *Y02T 10/7072* (2013.01); *Y02T 10/92* (2013.01); *Y02T 90/12* (2013.01); *Y02T 90/14* (2013.01)

(58) Field of Classification Search
USPC ......................................... 320/109, 107, 101
See application file for complete search history.

(56) References Cited

U.S. PATENT DOCUMENTS

| | | | | |
|---|---|---|---|---|
| 5,751,136 A | * | 5/1998 | Takechi ................ | H01M 10/46 320/150 |
| 2011/0022256 A1 | * | 1/2011 | Asada ..................... | B60L 53/65 701/22 |
| 2011/0213656 A1 | | 9/2011 | Turner | |

(Continued)

FOREIGN PATENT DOCUMENTS

| | | |
|---|---|---|
| CN | 102574476 A | 7/2012 |
| CN | 102803001 A | 11/2012 |

(Continued)

*Primary Examiner* — Alexis B Pacheco
(74) *Attorney, Agent, or Firm* — Reinhart Boerner Van Deuren P.C.

(57) ABSTRACT

Embodiments of a method for monitoring a charging process at a charging station are provided herein. In the method, the end of a charging process with an electric vehicle at the charging station is determined. In order to determine whether a vehicle is permanently connected to a charging station, without charging, it is proposed to carry out a charging readiness test with the electric vehicle at the charging station after the end of the charging process with this electric vehicle has been determined and to produce a signal at the charging station when charging readiness has been determined.

16 Claims, 2 Drawing Sheets

(51) Int. Cl.
*B60L 53/66* (2019.01)
*B60L 11/18* (2006.01)

(56) References Cited

U.S. PATENT DOCUMENTS

| | | | | |
|---|---|---|---|---|
| 2012/0319648 A1* | 12/2012 | Ohtomo | ............... | B60L 3/0069 320/109 |
| 2013/0300429 A1* | 11/2013 | Jefferies | ............... | B60L 53/16 324/511 |
| 2013/0314034 A1* | 11/2013 | Ang | ............... | H02J 7/1438 320/107 |
| 2013/0346166 A1 | 12/2013 | Chihara | | |
| 2014/0232355 A1* | 8/2014 | Masuda | ............... | B60L 3/0069 320/137 |
| 2015/0015211 A1* | 1/2015 | Choi | ............... | B60L 53/68 320/137 |
| 2015/0266388 A1* | 9/2015 | Im | ............... | H02J 7/0047 320/109 |
| 2015/0291039 A1* | 10/2015 | Sakata | ............... | B60L 50/10 307/10.1 |
| 2016/0052411 A1* | 2/2016 | Tanabe | ............... | B60L 53/20 320/109 |
| 2016/0059719 A1* | 3/2016 | Jung | ............... | B60L 11/1818 320/109 |
| 2016/0159237 A1* | 6/2016 | Morita | ............... | H02J 7/04 320/162 |

FOREIGN PATENT DOCUMENTS

| | | |
|---|---|---|
| DE | 10 2011 007 690 A1 | 3/2012 |
| DE | 10 2011 107 628 A1 | 1/2013 |
| DE | 11 2012 000 453 T5 | 10/2013 |
| EP | 2 505 415 A2 | 10/2012 |
| EP | 2 819 265 A1 | 12/2014 |
| JP | 2011-103721 A1 | 5/2011 |
| KR | 10-2013-0138586 A | 12/2013 |

* cited by examiner

METHOD AND DEVICE FOR CHECKING A CONNECTION BETWEEN AN ELECTRIC VEHICLE AND A CHARGING STATION

CROSS-REFERENCE TO RELATED PATENT APPLICATIONS

This patent application is a continuation of PCT/EP2016/055648, filed Mar. 16, 2016, which claims priority to German Application No. 10 2015 107 161.4, filed May 7, 2015, the entire teachings and disclosure of which are incorporated herein by reference thereto.

FIELD OF INVENTION

The subject-matter relates to a method and a device for checking a connection between an electric vehicle and a charging station.

BACKGROUND OF INVENTION

The acceptance of electric vehicles greatly depends on being able to charge such vehicles in a convenient way. Charging must not only be possible at home but at any time and also in other environments. To that end, at the present time, efforts are being made to set up a network of charging stations. However, since charging electric vehicles at charging stations usually takes a relatively long time, it is necessary for the availability of the charging station for a user to be guaranteed. It also cannot be expected that in the coming years the concentration of charging stations will be so high as is nowadays common with a petrol station network, so that a user will have to regularly search for a charging station in an unfamiliar environment.

For an operator of the charging station, particularly in semi-public areas, e.g. in shopping car parks or in multi-storey car parks, the parking space is, however, a relevant factor. The operators of charging stations also want to be able to make them available to as many users as possible. However, at the moment, it is not possible to determine whether an electric vehicle is actually charging at a charging station or whether the charging cable is just attached, but the actual charging process is complete. This is particularly the case for so-called DC charging, in particular for charging according to the CHADEMO standard. The operator of the charging station also cannot automatically determine whether a charging cable is still plugged in because a charging process is still taking place or whether a charging cable is only still attached, although the actual charging process is already complete. As a consequence, it is impossible for the operator to use the charging stations and parking space efficiently. In particular, the operator of the charging station cannot identify those users of the charging station who are using the parking space in front of the charging station only for parking and not for charging anymore.

BRIEF SUMMARY OF THE INVENTION

For this reason, the subject matter of the invention was based on the object of providing a method and a device, by means of which the use of a charging station by a plurality of users can be made more efficient. This object is achieved by a method and by a device according to exemplary embodiments disclosed herein.

By means of the method according to subject matter, it is possible to monitor a charging process at a charging station and in particular determine whether a charging process is complete, wherein at the same time, however, a charging cable remains attached to the electric vehicle which has previously been charged. For this purpose, according to the subject matter it is proposed that the end of a charging process with an electric vehicle is determined at the charging station side. This can take place in many ways, but a charging process is usually complete when the charging station no longer provides the electric vehicle with electric energy for charging the battery of the electric vehicle via the charging cable. The electric vehicle can also notify the charging station in a charging completion message that a charging process in the electric vehicle has been completed.

If it is determined that a charging process is complete, conventionally in many cases it cannot, however, be determined whether the electric vehicle has also subsequently been correctly separated from the charging cable. In particular, in most charging procedures all communication between the electric vehicle and the charging station end with the completion of the charging process, with the result that the charging station no longer communicates with the electric vehicle. This end in the communication is in the case of most charging procedures caused by protocols, since the protocols assume that with the end of the charging process further communication between the electric vehicle and the charging station is no longer necessary.

After it has been determined at the charging station side that a charging process with an electric vehicle has been completed, it is proposed according to the subject matter that at the charging station a charging readiness test is (again) carried out. It has been identified according to the subject matter that this charging readiness test at the charging station can be carried out with the same electric vehicle, with which the charging process has previously been determined as complete. That means that according to the subject matter after the end of the charging process with a certain electric vehicle has been determined at the charging station side a charging readiness test will be carried out with this electric vehicle. Communication, which shortly before had been ended due to the end of the charging process, is again established with the electric vehicle by means of this charging readiness test.

If the electric vehicle signals to the charging station its charging readiness in the course of this charging readiness test, the charging station determines the charging readiness of this electric vehicle. In this case, the charging station, according to the subject matter, produces a signal which is suitable for further processing. Such a signal can be used to directly output an optical or acoustic signal at the charging station. Such a signal can also, for example, be used to indicate to the user of the electric vehicle via a central computer by electronic means, for example by means of short message, email, telephone call or the like, that the charging process is complete and that he/she should kindly remove his/her car from the charging station. The signal can also be delivered to a parking space management system. By means of this signal, it is possible, for example, to levy a parking space use charge in the parking space management system, in particular for the time from the end of the charging process. Other possibilities for using the generated signal are also, of course, possible according to the subject matter.

By means of the method according to the subject matter, after a charging process has been completed, in which usually communication with the electric vehicle ends, it can nevertheless be determined whether the electric vehicle remains attached to the charging cable. Up to now, it has only been possible to determine the end of the charging process at the charging station side, but not automatically whether the then charged electric vehicle had also been electrically and mechanically disconnected from the charging station after charging. This is possible by means of the method according to the subject matter.

According to the subject matter, it is proposed according to one exemplary embodiment that during the charging readiness test at the charging station side at least one short-circuit test between the charging station and an electric vehicle and optionally additionally an insulation test are carried out. In the case of a short-circuit test, it is determined whether the electric vehicle is electrically connected to the charging cable which is preferably durably affixed to the charging station. In this case, an electrical short circuit forms between the charging station and the electric vehicle via the charging cable, i.e. a direct connection between the electric vehicle and the charging cable. If this is determined, a charging readiness can be detected.

It is also possible for at least one charging sequence to be initiated on the charging station side according to the subject matter during the charging readiness test. A charging sequence can, for example, be initiated by transmitting a charging readiness enquiry to the electric vehicle via the charging cable. Such a charging readiness enquiry is specified in various charging protocols. In particular, in the case of so-called direct current charging (DC charging), preferably according to the CHAdeMO standard, communication is initiated between the charging station and the electric vehicle at the beginning of a charging process on the conductors of the charging cable which are provided for this purpose. In response to the initiation of the charging sequence, in particular in response to the transmission of the charging readiness enquiry from the charging station to the electric vehicle via the charging cable, the electric vehicle can signal its charging readiness in a response message. In this respect, it is proposed according to the subject matter that on the charging station side a response from the electric vehicle to the initiated charging sequence is awaited. If there is a response from the electric vehicle to the initiated charging sequence, it can be assumed that the electric vehicle is still attached to the charging cable. In the case where a response from the electric vehicle to the initiated charging sequence fails to appear at the charging station, it can be concluded that the electric vehicle has been disconnected from the charging cable.

Since, in the case of the method according to the subject matter, before carrying out a charging readiness test according to step b) the charging process has already been completed, which has been detected in step a), it is not necessary to fully carry out a charging process again. This is also not wanted. In this respect, however, in the case of the method according to the subject matter, when a charging readiness has been determined according to step b), the subsequent exchange of charging energy between the charging station and the electric vehicle is prevented at the charging station side. Here, according to an embodiment, the charging readiness test is ended at the charging station side before the exchange of charging energy between the charging station and the electric vehicle. In this respect, it is proposed according to the subject matter that only a partial charging readiness test is carried out without fully completing the charging readiness test.

However, if it has been determined at the charging station side that the electric vehicle has been disconnected from the charging cable, determining the charging readiness is no longer required and it can be recorded at the charging station that with a following charging readiness test the charging process can be fully carried out. That is to say, that the charging readiness test is only ended before the exchange of charging energy until prior to this the disconnection of the electric vehicle from the charging cable has been determined. This can occur, for example, by determining the absence of a response from the electric vehicle to the charging readiness test. Then, a new electric vehicle can quite normally go through the complete charging cycle together with a full charging readiness test and exchange of electric energy between the charging station and the electric vehicle.

According to an embodiment, it is proposed that at the charging station side after determining the end of the charging process according to step a) firstly a defined period of time is waited until step b) is triggered at the charging station. Usually, the charging readiness test is carried out, for example, at 30 second, minute, two minute or five minutes intervals. An excessive communication load on the charging cable between the charging station and the electric vehicle is hereby prevented. In addition, the user of the electric vehicle is given the chance to disconnect the electric vehicle from the charging cable in accordance with the regulations after the end of the charging process. However, the defined time must not be too long, so as not to miss the period of time in which an electric vehicle is disconnected and by which a new electric vehicle is connected to the charging cable. In this case, during the charging readiness test according to step b) a charging readiness of another electric vehicle would be determined and the exchange of charging energy would be prevented, although a new electric vehicle is connected to the charging station.

However, it is also possible for a new electric vehicle to automatically signal its charging readiness to the charging station before the start of a charging process. If this is provided in the protocol for the connection between the electric vehicle and the charging station, the check for whether a response from an electric vehicle is absent can be omitted. Then, when a new electric vehicle is connected to the charging station, the signalling from the new vehicle to the charging station occurs automatically. A signal is then received from a new electric vehicle at the charging station side that it is connected and the conventional charging process can be initiated.

In order to be able to continuously determine whether the vehicle which has completed the charging process is still attached at the charging station, it is proposed according to an embodiment that step b) is repeatedly carried out. Step c) is preferably only then carried out when charging readiness has been determined. Step b) is preferably carried out at intervals, in particular at intervals of 30 seconds, of a minute, of five minutes, of ten minutes etc. A suitable choice of the time interval is in particular a one minute interval, since then it can be determined at regular intervals if a first vehicle has been disconnected and a second vehicle has been connected.

According to an embodiment, it is proposed that before step a) a charging process is initiated and carried out. As already mentioned, at step a) the charging process is already complete and this end of the charging process with the electric vehicle is determined at the charging station. However, this requires that before step a) the charging process was at least carried out if not also initiated itself by the charging station, for example by means of a charging readiness test with subsequent transfer of energy from the charging station to the electric vehicle.

The method according to the subject matter is particularly suitable for charging processes according to the CHAdeMO standard. The method according to the subject matter can also be suitable for other direct current charging processes. Particularly in the case of the described CHAdeMO standard, up to now it has not been possible to determine at the charging station after the charging process has ended whether the electric vehicle remains connected to the charging station or not. This problem is solved by means of the method according to the subject matter.

Preferably, the method according to the subject matter is applied in a so-called multi-charger which provides various charging options. Such a multi-charger can, for example, have at least one charging socket for alternating current charging and additionally a durably attached charging cable for direct current charging. In particular, the durably attached charging cable is suitable for charging according to the CHAdeMO standard. In this case, the electric vehicle does not need to carry its own charging cable with it.

According to an embodiment, it is proposed that when determining the end of a charging process at the charging station side a charging completion signal is received from the vehicle. In particular according to the CHAdeMO standard, when the end of charging has been determined, in particular when the charging control device build into the vehicle determines that the battery is fully charged, the vehicle transmits a charging completion signal on the charging cable. This charging completion signal can be detected on the charging cable at the charging station side and the end of the charging process can be determined. In particular according to the CHAdeMO standard, the charging station and the vehicle then end all communication, in particular all standard-compliant communication. Therefore, the charging station can no longer determine according to the standard whether or not the vehicle has been electrically and mechanically disconnected from the charging station or charging cable.

According to an embodiment, it is proposed that the charging station interrupts the charging current directly after receiving the charging completion signal. Hence, initially the charging current is interrupted between steps a) and c). The charging current is interrupted in particular directly after step a), since then at the charging station side it is certain that no more electric energy has to be provided by the charging station via the charging cable to the electric vehicle.

According to an embodiment, it is proposed, as mentioned above, that the signal generated at the charging station side is evaluated at the charging station side and an optical or acoustic signalling device is activated at the charging station side in response to the signal.

However, according to an embodiment, it is also possible for the signal generated at the charging station to be transmitted to a computer spatially remote from the charging station and further processed in the computer. This computer can, for example, have a connection to a wide-area network, in particular a telecommunications network, for example a mobile communication network or the internet, and transmit a message, for example via a short message centre of the mobile communication network or a short message service, to a user of the charging station, in particular as a text message. An email can also be sent to the user of the charging station. The computer can also be connected to a parking space management system or be part of it, in order to provide the parking space management system with the possibility of levying different parking tariffs for the user of the electric vehicle depending on the charging state, i.e. whether charging is still continuing or is complete.

According to an embodiment, it is proposed that only after it has been determined in step b) that there is no charging readiness, a new charging process can be carried out at the charging station side, in which after a charging readiness has been determined charging energy is delivered by the charging station. As already explained, it must be possible for a new electric vehicle to carry out a full charging process. This requires that the charging readiness of the new electric vehicle is determined at the charging station side. However, it must be able to be determined that there is no longer a connection to the previous electric vehicle, i.e. it must firstly be determined that no charging readiness exists on the charging cable or the new electric vehicle initiates a charging process with respect to the charging station. Only then can it be concluded that a new electric vehicle is attached.

However, it is also possible for a new charging process to be triggered manually. A user interface, e.g. a button, a touch display or the like, can be provided for this purpose. The user by interacting with the user interface, e.g. by pressing the button at the charging station, can trigger a new charging process. It can then be reliably determined that a new charging process is to be started.

A further aspect is a device in which a charge control circuit is provided at the charging station side. The charge control circuit is programmed in order to function e.g. according to a certain charging protocol, such as the CHAdeMO protocol. In accordance with the programming, the charge control circuit is arranged to communicate with an electric vehicle via a charging cable. The charge control circuit is also arranged to enable and block the transfer of electric energy for charging an electric vehicle.

In addition, according to the subject matter, the charge control circuit also has a charge state monitoring circuit. This charge state monitoring circuit is arranged to for determine the end of a charging process with the electric vehicle. The charge state monitoring circuit is also arranged to additionally activate a charging readiness test circuit after the end of a charging process has been determined. The charging readiness test circuit is arranged to carry out a charging readiness test with the electric vehicle after the end of the charging process with this electric vehicle has been determined and to produce a signal when charging readiness has been determined.

The previously mentioned methods can also be implemented as a computer program or as a computer program stored on a storage medium. Here, on the counter and/or calibration side a microprocessor can be suitably programmed for carrying out the respective method steps by a computer program.

The features of the methods and devices can be freely combined together. In particular, features and part features of the description and/or of the dependent and independent claims can, even with full or partial bypassing of features or part features of the independent claims, alone or freely combined together, be independently inventive. The subject matter of the invention is explained in more detail below with the aid of the figures illustrating exemplary embodiments.

DETAILED DESCRIPTION OF THE INVENTION

Figure 1:
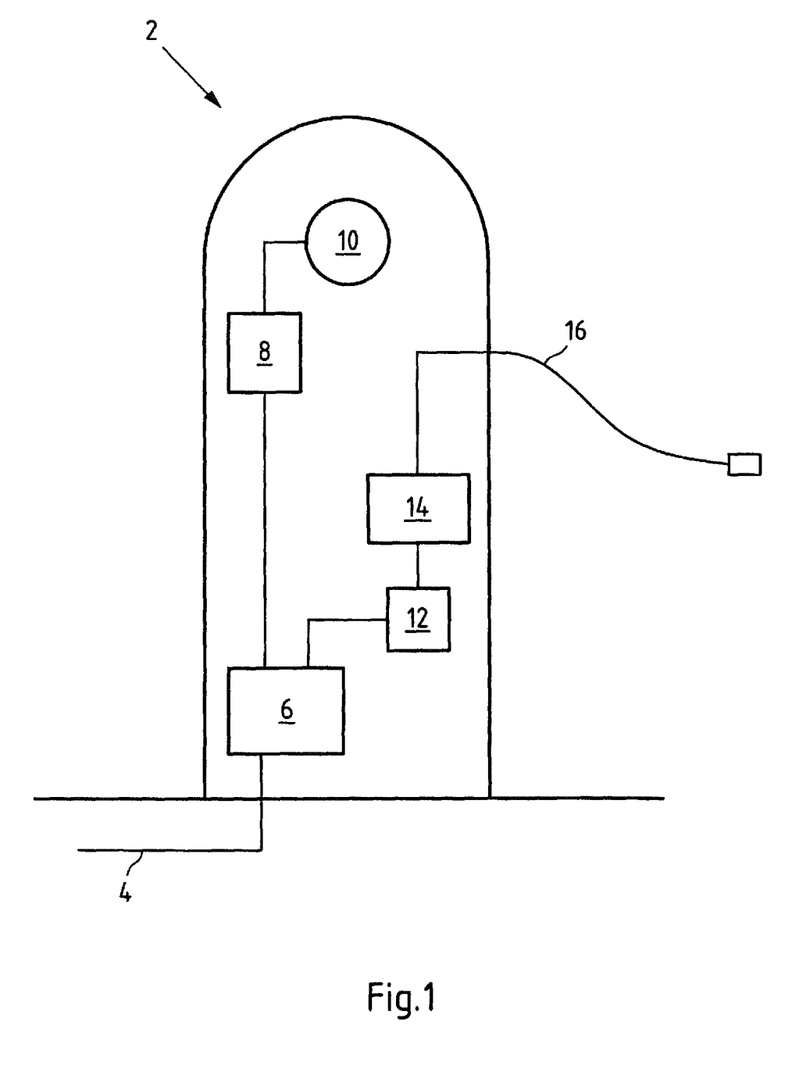
FIG. 1 shows a charging station according to the subject matter.

FIG. 1 shows a charging station 2 for charging electric vehicles. Electric vehicles in the sense of the subject matter of the invention can, for example, be plug-in hybrid vehicles (PHEVs) and pure electric vehicles (EVs). Vehicles can, for instance, be motor cars, trucks, motorbikes and electric bikes.

The charging station 2 is connected to an electric utility network 4 via a safety circuit 6, in particular comprising safety fuse and contactor.

The charging station 2 illustrated in FIG. 1 is a so-called multi-charger, in which various charging variants are provided. Of course, charging stations which only provide one single charging process also fall within the meaning of the subject matter of the invention.

Emanating from the safety circuit 6, in the charging station 2 a connection branches to a charging control device 8 for alternating current charging (AC charging). The charging control device 8 in particular comprises a transformer and logic for communicating with an electric vehicle. The charging control device 8 can be contacted with a charging cable (not shown) via a socket 10.

Emanating from the safety circuit 6, a further branch to a rectifier 12 is provided. In the rectifier 12, a direct current voltage is generated which is conveyed via a second charging control device 14 to a charging cable 16 durably attached to the charging station 2.

The charging control device 14 works in particular according to the CHAdeMO principle and has inter alia means for communicating with the vehicle, charge state monitoring circuits and charging readiness test circuits within the meaning of the subject matter. The charging control device 14 is programmed according to the subject matter such that it can carry out the method according to FIG. 2.

Figure 2:
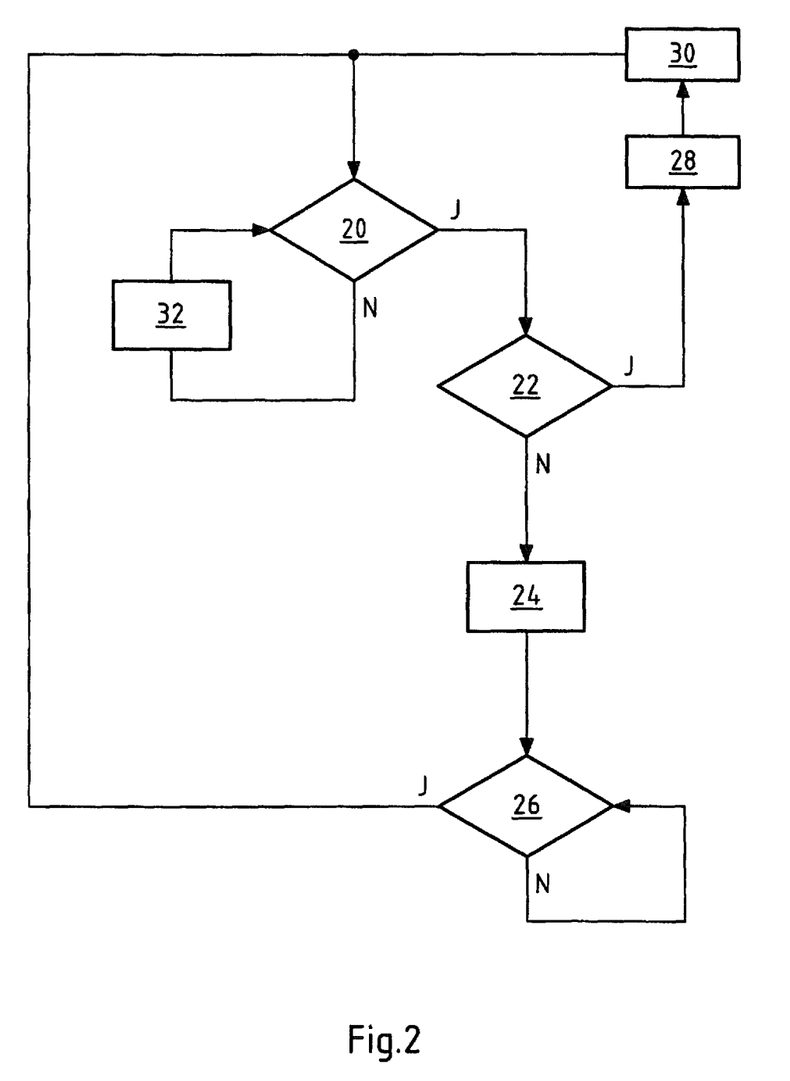
FIG. 2 shows a process flow of a method according to an embodiment of the subject matter.

Usually, the charging station 2, as shown in FIG. 2, is in charging readiness mode and enquires in a step 20 via the charging cable 16 about the charging readiness of an electric vehicle. This charging readiness test 20 can be a short-circuit test, in which it is checked whether an electric vehicle is electrically connected (short-circuited) to the charging station 2. However, the charging readiness test 20 can also alternatively or cumulatively involve establishing a first charging communication with the electric vehicle via the charging cable 16. In step 20, the charging control device 14 monitors the reception of a charging readiness from the electric vehicle via the charging cable 16. If the charging control device 14 receives a charging readiness from an electric vehicle on the charging cable 16, step 22 is branched to.

In step 22, it is checked whether the charging control device 14 has previously determined on the charging cable 16 that a charging readiness does not exist. This can be through checking a memory, in which a marker is set. By setting the marker to HIGH it can be signalled that a charging readiness continues to exist. By setting the marker to LOW it can be signalled that a charging readiness does not exist. The setting of the marker is further described below.

If it is determined that the marker is set to LOW, step 24 is branched to. In step 24, a charging process is carried out, that is to say, the charging readiness test, which is still to be completed as appropriate, and the transfer of electric energy for charging the battery via the charging cable 16 take place according to the protocol. This protocol can, for example, be the CHAdeMO protocol. During the charging process, in step 26 it is continuously, i.e. in intervals, checked whether a charging completion signal has been received on the charging cable 16 from the electric vehicle. If this is not the case, the check continues in step 26. If a charging completion signal has been received, the method branches back to step 20 and the charging readiness test according to the subject matter of the invention begins.

Previously, the marker has been set to HIGH either in step 22 with the branch to step 24, in step 24 or in step 26. It is hereby signalled that currently a charging process has been carried out.

In subsequent step 22, a charging readiness is checked via the charging cable 16. In the described example, the electric vehicle is still attached to the charging cable 16 and signals its charging readiness to the charging control device 14. That is to say, that step 20 again branches to step 22.

In step 22, the status of the marker is checked and, in this case, it is determined that, since the marker is set to HIGH, charging readiness was signalled from the same electric vehicle which was previously charged in steps 24 and 26. For this reason, step 22 branches to step 28. In step 28, a signal is generated which can be used for further processing. This signal generated at the charging station can, for example, be used to output an optical or acoustic signal at the charging station 2.

The signal can also be transmitted from the charging station 2 via a communications interface, wire-connected or wireless, to a remote computer and further processed there for further measures.

After the signal has been generated in step 28, this step branches to step 30 and waits for a waiting period, for instance 30 seconds or one minute.

After the waiting period, step 20 is branched to and a charging readiness test is again carried out. If the electric vehicle is still attached to the charging cable 16, then the charging control device 14 again goes through steps 22, 28 and 30.

At a point in time, the electric vehicle will have been disconnected from the charging cable. If after this point in time step 20 is branched to, then the charging readiness test leads to the conclusion that no charging readiness exists. In this case, step 32 is branched to, in which the marker is set to LOW. Subsequently, preferably after a waiting period, step 20 is again branched to and the charging readiness test is again carried out. The charging readiness test 20 is carried out at intervals until a charging readiness is again signalled on the charging cable 16.

Then, step 22 is again branched to, in which, however, it is determined that the marker is set to LOW and charging can be carried out again and the above described steps 24 and 26 can again be gone through.

By means of the method according to the subject matter, it is possible, in particular when using the CHAdeMO standard, to reliably determine the continual connection of an electric vehicle to a charging cable even after a charging process has completed. Then, measures can be taken as appropriate, in order to make the charging station 2 available for further use, in particular to prompt the user of the charging station 2 to disconnect the charging cable 16 from his/her electric vehicle and hence free the charging station 2 for further use.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

LIST OF REFERENCE NUMBERS

2 Charging station
4 Energy supply network
6 Safety circuit
8 Charging control device
10 Socket
12 Rectifier
14 Charging control device
16 Charging cable
20 Charging readiness test
22 Marker test
24 Charging process
26 Charging completion test
28 Signal production
30 Waiting period
32 Reset marker

The invention claimed is:

1. A method for monitoring a charging process at a charging station comprising:
   a) determining, at the charging station, the end of a charging process with an electric vehicle according to a charging readiness test;
   b) carrying out, at the charging station, the same charging readiness test with the electric vehicle after the end of the charging process with this same electric vehicle has been determined, wherein communication, which had been ended due to the end of the charging readiness test according to step a) is again established between the electric vehicle and the charging station;
   c) producing a signal at the charging station when charging readiness has been determined.

2. The method of claim 1, wherein during the charging readiness test at the charging station at least one insulation test and one short-circuit test are carried out between the charging station and an electric vehicle.

3. The method of claim 2, wherein during the charging readiness test at least one charging sequence is initiated at the charging station and the charging station waits for a response from the electric vehicle to the initiated charging sequence.

4. The method of claim 1, wherein during the charging readiness test at least one charging sequence is initiated at the charging station and the charging station waits for a response from the electric vehicle to the initiated charging sequence.

5. The method of claim 1, wherein the charging readiness test is completed at the charging station before the exchange of charging energy between the charging station and the electric vehicle.

6. The method of claim 1, wherein at the charging station after determining the end of the charging process of step a) firstly a defined period of time is waited until step b) is triggered at the charging station.

7. The method of claim 1, wherein step b) is repeatedly carried out.

8. The method of claim 1, wherein before step a) a charging process is initiated and carried out at the charging station.

9. The method of claim 1, wherein the charging process is carried out as a direct current charging process.

10. The method of claim 9, wherein the direct charging process is performed according to the CHAdeMO standard.

11. The method of claim 1, wherein when determining the end of a charging process a charging completion signal is received from the vehicle.

12. The method of claim 1, wherein the charging current is interrupted between steps a) and c).

13. The method of claim 1, wherein the signal produced at the charging station is evaluated at the charging station and an optical or acoustic signaling device is activated at the charging station in response to the signal.

14. The method of claim 1, wherein the signal produced at the charging station is transmitted to a computer spatially emote from the charging station and is further processed in the computer.

15. The method of claim 1, wherein only when it has been determined in step b) that there is no charging readiness can a new charging process be carried out at the charging station, in which after charging readiness has been determined charging energy is delivered by the charging station.

16. A device, designed for carrying out the method of claim 1, comprising:
   a charge control circuit at the charging station designed for communicating with an electric vehicle via a charging cable and for conveying electric energy to charge the electric vehicle via the charging cable;
   wherein the charge control circuit has a charge state monitoring circuit designed for determining the end of a charging process with the electric vehicle and additionally has a charging readiness test circuit which is designed to carry out a charging readiness test with the electric vehicle to determine the end of the charging process and wherein the charging readiness test circuit is further designed to carry out the same charging readiness test again with the same electric vehicle after the end of the charging process with this same electric vehicle has been determined, wherein communication, which had been ended due to the end of the charging readiness test is again established by the charging readiness test circuit between the electric vehicle and the charging station.

* * * * *

UNITED STATES PATENT AND TRADEMARK OFFICE
CERTIFICATE OF CORRECTION

PATENT NO. : 11,034,251 B2  Page 1 of 1
APPLICATION NO. : 15/801553
DATED : June 15, 2021
INVENTOR(S) : Stephan Hell It is certified that error appears in the above-identified patent and that said Letters Patent is hereby corrected as shown below:

In the Claims

Column 10 Line 48 Claim 14, Line 3, reads "emote from the charging station and is further processed in" and should read --remote from the charging station and is further processed in--

Signed and Sealed this
Tenth Day of August, 2021

Drew Hirshfeld
*Performing the Functions and Duties of the
Under Secretary of Commerce for Intellectual Property and
Director of the United States Patent and Trademark Office*